(12) United States Patent
Fujiwara et al.

(10) Patent No.: US 12,179,565 B2
(45) Date of Patent: Dec. 31, 2024

(54) MOBILE BODY MOVING DEVICE

(71) Applicant: HI-LEX CORPORATION, Takarazuka (JP)

(72) Inventors: Ken-ichi Fujiwara, Takarazuka (JP); Atsushi Joko, Takarazuka (JP)

(73) Assignee: HI-LEX CORPORATION, Takarazuka (JP)

( * ) Notice: Subject to any disclaimer, the term of this patent is extended or adjusted under 35 U.S.C. 154(b) by 244 days.

(21) Appl. No.: 17/286,055

(22) PCT Filed: Oct. 30, 2019

(86) PCT No.: PCT/JP2019/042477
§ 371 (c)(1),
(2) Date: Apr. 16, 2021

(87) PCT Pub. No.: WO2020/090854
PCT Pub. Date: May 7, 2020

(65) Prior Publication Data
US 2021/0355734 A1    Nov. 18, 2021

(30) Foreign Application Priority Data
Oct. 31, 2018    (JP) ................................. 2018-205615

(51) Int. Cl.
*B60J 5/10*        (2006.01)
*E05F 15/611*    (2015.01)

(52) U.S. Cl.
CPC ............. *B60J 5/101* (2013.01); *E05F 15/611* (2015.01); *E05Y 2400/36* (2013.01); *E05Y 2900/546* (2013.01)

(58) Field of Classification Search
CPC ............. E05F 15/63; B60J 5/101; B60J 5/105
See application file for complete search history.

(56) References Cited

U.S. PATENT DOCUMENTS 7,808,197 B2    10/2010  Kimura et al.
10,378,265 B2    8/2019  Watanabe
(Continued)

FOREIGN PATENT DOCUMENTS

JP    2005023633 A    1/2005
JP    2005351042 A    12/2005
(Continued)

OTHER PUBLICATIONS

International Search Report for International Application No. PCT/JP2019/042477; Date of Mailing, Jan. 7, 2020.

*Primary Examiner* — Gregory J Strimbu
(74) *Attorney, Agent, or Firm* — CANTOR COLBURN LLP

(57) ABSTRACT

A mobile body moving device includes a mobile body moved to open and close an opening; a drive unit for moving the mobile body; a sensor for detecting movement of the mobile body; and a control unit controlling driving of the mobile body by the drive unit. In a high-speed region, the control unit controls the driving of the drive unit so that an actual speed of the mobile body calculated based on a detected value detected by the sensor is adjusted to a speed calculated by a target movement speed rule by comparing the actual speed and the speed calculated by the target movement speed rule, and in a low-speed region, the control unit controls the driving of the drive unit by comparing a predicted actual speed calculated by a predetermined low-speed movement speed rule and a predicted target speed calculated by the target movement speed rule.

1 Claim, 9 Drawing Sheets

(56) References Cited

U.S. PATENT DOCUMENTS

| | | | |
|---|---|---|---|
| 2005/0275363 A1 | 12/2005 | Honma et al. | |
| 2008/0001563 A1* | 1/2008 | Kimura | B60J 5/10 |
| | | | 318/280 |
| 2010/0071264 A1* | 3/2010 | Faulkner | E05F 15/63 |
| | | | 49/345 |
| 2017/0044815 A1 | 2/2017 | Watanabe | |
| 2018/0223575 A1* | 8/2018 | Hucker | E05F 15/79 |
| 2022/0243521 A1* | 8/2022 | Herman | E05F 15/622 |

FOREIGN PATENT DOCUMENTS

| | | | |
|---|---|---|---|
| JP | 2006333691 A | 12/2006 |
| JP | 2008002089 A | 1/2008 |
| JP | 2008184740 A | 8/2008 |
| JP | 2017036602 A | 2/2017 |
| KR | 20100045374 B1 | 5/2010 |

\* cited by examiner

MOBILE BODY MOVING DEVICE

CROSS REFERENCE TO RELATED APPLICATIONS

This is the U.S. national stage of application No. PCT/JP2019/042477, filed on Oct. 30, 2019. Priority under 35 U.S.C. § 119 (a) and 35 U.S.C. § 365 (b) is claimed from Japanese Application No. 2018-205615 filed Oct. 31, 2018, the disclosure of which is also incorporated herein by reference.

TECHNICAL FIELD

The present invention relates to a technique for a mobile body moving device.

BACKGROUND ART

A mobile body (e.g., back door of a vehicle) that moves by being driven by a drive unit is controlled to perform a predetermined operation.

As a device that performs such an operation, a motor control device that controls a motor for driving a driven body to operate at a target speed by a control means such as a CPU is disclosed (see, for example, Patent Literature 1).

In such a device, a movement speed and a position of the mobile body are specified by information detected by a detection unit such as a rotation sensor, and a control unit controls driving of a drive unit based on the specified movement speed and position of the mobile body.

CITATIONS LIST

Patent Literature

Patent Literature 1: JP-A 2006-333691 Gazette

SUMMARY OF INVENTION

Technical Problems

However, the detection unit, which performs detection every predetermined time so that the control unit determines a movement speed and a position of a mobile body, erroneously determines that the drive unit is not being driven although the drive unit is being driven in a case where a target to be detected such as a magnet is not positioned within a detectable range of the detection unit due to slowing down of the movement speed of the mobile body.

When such erroneous determination occurs, the control unit drives the drive unit to increase the movement speed of the mobile body in order to bring the movement speed of the mobile body closer to a target speed from a stopped state based on the erroneous determination, and decreases the movement speed of the mobile body by suppressing driving of the drive unit when the detection unit becomes able to detect the target to be detected as a result of the increase of the movement speed.

Then, when the movement speed of the mobile body slows down again, the increase and decrease of the movement speed are repeated. As a result, a phenomenon called "shaking" occurs while the mobile body is moving at a low speed.

An object of the present invention is to provide a mobile body moving device that suppresses such "shaking".

Solutions to Problems

The problem to be solved by the present invention is described above. Next, means for solving the problem will be described.

A mobile body moving device according to the present invention includes a mobile body; a drive unit that moves the mobile body; a sensor that detects movement of the mobile body; and a control unit that controls driving of the drive unit based on a target movement speed rule that prescribes a movement speed of the mobile body according to a position of the mobile body, wherein in a high-speed region where the mobile body moves at a speed faster than a predetermined speed, the control unit controls driving of the drive unit so that a mobile body actual speed based on mobile body information from the sensor is adjusted to a speed of the target movement speed rule by comparing the mobile body actual speed and the target movement speed rule, and in a low-speed region where the mobile body moves at a speed less than or equal to the predetermined speed, the control unit drives the drive unit by comparing a predetermined low-speed movement speed rule and the target movement speed rule.

Advantageous Effects of Invention

The present invention produces the following effect.

Specifically, according to the mobile body moving device of the present invention, "shaking" can be suppressed.

DESCRIPTION OF EMBODIMENT

Next, a mobile body moving device 1 according to an embodiment of the present invention will be described with reference to FIG. 1 to FIG. 9.

For convenience of description, in the following description, a top-bottom direction, a front-rear direction, and a left-right direction of a vehicle 100 are defined by directions of the arrows illustrated in FIG. 1 to FIG. 4.

[Configuration of Mobile Body Moving Device 1]

First, a configuration of the mobile body moving device 1 will be described with reference to FIG. 1 to FIG. 5.

The mobile body moving device 1 according to the present embodiment moves a mobile body, which is a target, in a predetermined direction by a drive unit including an electric motor.

Figure 1:
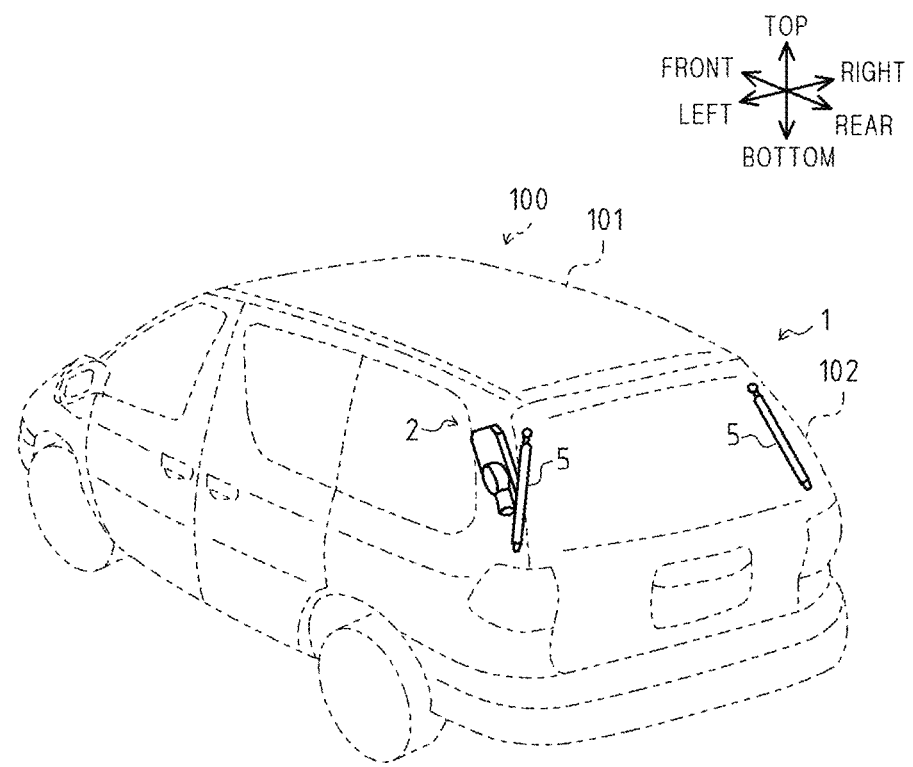
FIG. 1 illustrates a schematic configuration of a vehicle including a mobile body moving device according to an embodiment of the present invention.

The mobile body moving device 1 is, for example, a back door opening/closing device that moves (rotates) a back door 102 in the top-bottom direction (see FIG. 1). The back door 102 serves as a mobile body and opens and closes an opening 101a (see FIG. 2) of a rear face of a vehicle body 101 of a vehicle 100.

The configuration of the mobile body moving device 1 is not limited to the back door opening/closing device in the present embodiment and can be, for example, a sliding door opening/closing device that opens and closes a sliding door that is slidable in the front-rear direction on a side face of the vehicle body 101.

Alternatively, the mobile body moving device 1 may be an opening/closing device that opens and closes a mobile body such as a shutter, a sliding door, or a hinged door of a structure such as a shop or a garage, or a foldable eave in an upper part of an opening of a front face of the structure.

That is, the mobile body moving device 1 according to the embodiment of the present invention is not limited to the opening/closing drive device that opens and closes the back door 102 and can be applied to various devices that moves an object or a structure to be moved in the top-bottom direction, the left-right direction, or an oblique direction.

The mobile body moving device 1 mainly includes a back door 102, which is an example of a mobile body, a drive unit 2 that moves the back door 102 to open and close, a rotation sensor 3 (see FIG. 4) provided in the drive unit 2, and a control unit 4 (see FIG. 2) that controls driving of the drive unit 2.

The back door 102 is provided at an upper end of a rear portion of the vehicle body 101 so as to be movable (rotatable) in the top-bottom direction with a hinge or the like (not illustrated) interposed therebetween.

The back door 102 can move between a closed position (see FIG. 2) and an opened position (see FIG. 3) by rotating around the upper end.

Figure 2:
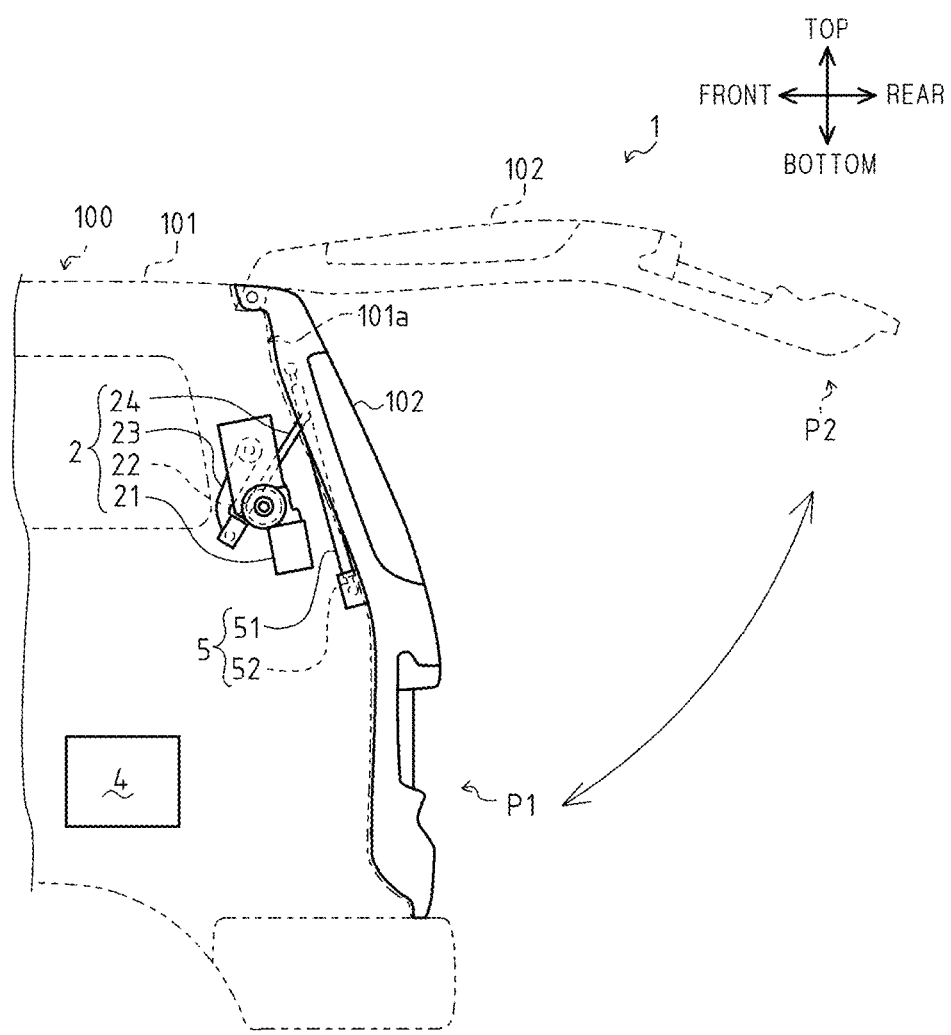
FIG. 2 illustrates a state where a back door of the vehicle is at a closed position.

As illustrated in FIG. 2, the drive unit 2 includes an electric motor 21, a clutch 22, an arm 23, and a rod 24.

The electric motor 21 generates driving force for rotating the back door 102 in an opening direction or a closing direction based on a control signal from the control unit 4.

The driving force generated by the electric motor 21 can be transmitted to the arm 23 via the clutch 22.

The clutch 22 can switch between a connected state in which the driving force from the electric motor 21 is transmitted to the arm 23 and a disconnected state in which the driving force from the electric motor 21 is not transmitted to the arm 23, based on the control signal from the control unit 4.

One end of the arm 23 is rotatably supported by the vehicle body 101, and the arm 23 is driven in a rotating direction about the one end by the driving force transmitted from the electric motor 21 via the clutch 22.

One end of the rod 24 is rotatably connected to the other end of the arm 23, and the other end of the rod 24 is rotatably supported by the back door 102.

As illustrated in FIG. 2, the arm 23 and the rod 24 are located in the vehicle body 101 while the back door 102 is at a closed position.

When the clutch 22 is switched from this state to the connected state and the electric motor 21 is driven to rotate the back door 102 in the opening direction, the arm 23 rotates in counterclockwise direction in FIG. 2 and the rod 24 pushes the back door 102 up in the opening direction.

Figure 3:
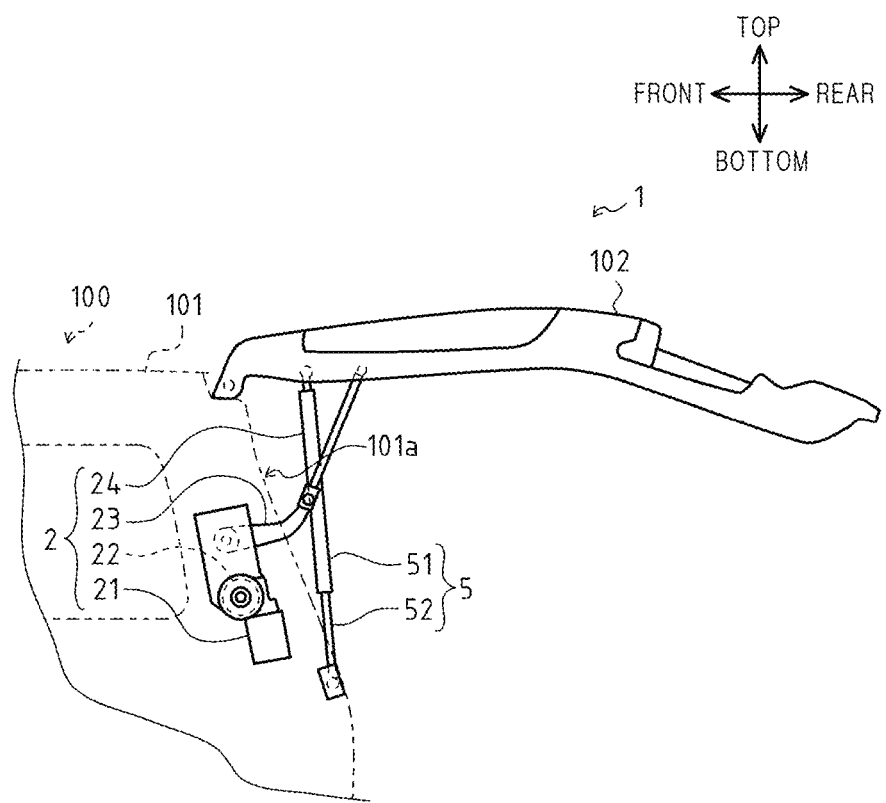
FIG. 3 illustrates a state where the back door of the vehicle is at an opened position.

The back door 102 shifts to the opened position as illustrated in FIG. 3 by being pushed up by the rod 24.

Meanwhile, when the clutch 22 is switched to the connected state and the electric motor 21 is driven to rotate the back door 102 in the closing direction while the back door 102 is at the opened position as illustrated in FIG. 3, the arm 23 rotates in clockwise direction in FIG. 3, and the rod 24 pulls the back door 102 to rotate the back door 102 in the closing direction.

The back door 102 shifts to the closed position as illustrated in FIG. 2 by being rotated in the closing direction.

The drive unit 2 may be a drive mechanism that includes a body cylinder, a slide cylinder, a motor, a spindle, a spindle nut, and an urging member, and the body cylinder, the motor, the spindle, and the urging member may constitute a drive body part, and the slide cylinder and the spindle nut may constitute an advancing/retreating part. In a case where this drive mechanism is used as the drive unit 2, one end side of the body cylinder is rotatably fixed to a base such as a vehicle, and the other end side of the body cylinder is opened. The body cylinder is arranged so that the slide cylinder is disposed therein so as to slidably move in a longitudinal direction and protrude from the other end side of the body cylinder 201.

A damper 5 is provided between the vehicle body 101 and the back door 102.

The damper 5 gives urging force to a rod 52 by compressed gas sealed inside a tube 51 and urges the back door 102 in upward direction such that the back door 102 is pushed up.

Furthermore, a load on the electric motor 21 can be reduced by the urging force of the damper 5 when the back door 102 is rotated in the opening direction by the driving force of the electric motor 21.

Furthermore, the back door 102 can be kept at the opened position by the urging force of the damper 5 when the clutch 22 is switched to the disconnected state. In the present embodiment, the drive unit 2 is provided on one side of the vehicle and the damper 5 is provided on the other side, but the drive unit 2 may be provided on both sides of the vehicle. Although a gas damper is used as the damper 5 in the present embodiment, the damper 5 is not limited to a gas damper as long as the damper 5 has urging force capable of supporting the back door 102.

The rotation sensor 3 is a sensor for detecting movement of the back door 102, and detects an actual speed (opening/closing speed), a moving direction, and a position of the back door 102.

Figure 4:
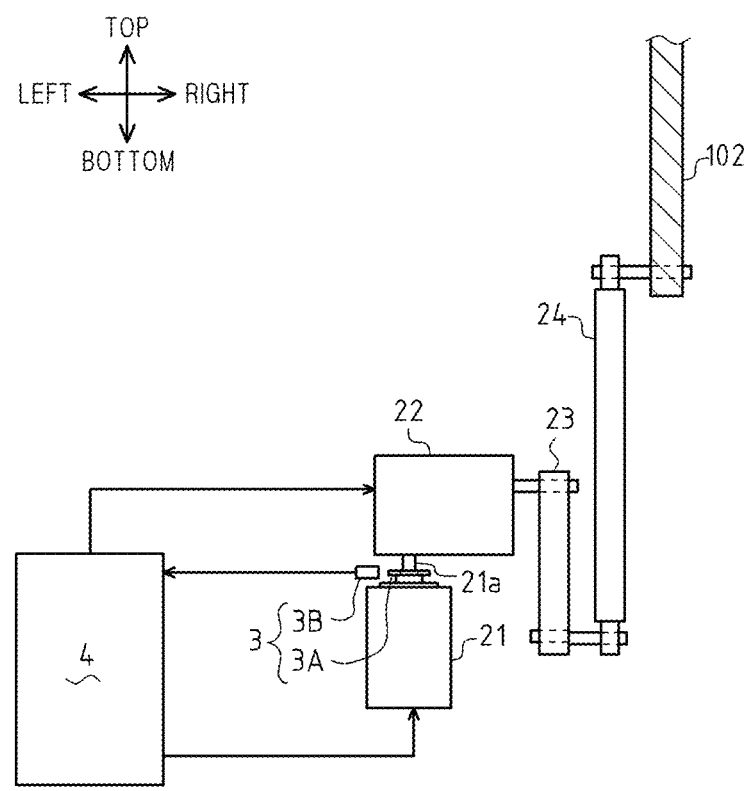
FIG. 4 illustrates a schematic configuration of the mobile body moving device according to the embodiment of the present invention.

As illustrated in FIG. 4, for example, the rotation sensor 3 is constituted by a multi-pole magnetizing magnet 3A fixed to a drive shaft 21a of the electric motor 21 and two Hall ICs 3B-3B (only one Hall IC is illustrated in FIG. 4, which is a schematic view) that are disposed by a phase difference of 90 degrees from each other in the vicinity of a rotation trajectory of the multi-pole magnetizing magnet 3A.

When the electric motor 21 operates and the drive shaft 21a is rotated, pulse signals whose phases are deviated by 90 degrees from each other are output from the Hall ICs 3B at a cycle corresponding to a rotation speed of the drive shaft 21a.

The pulse signals output from the Hall ICs 3B are sent to the control unit 4.

Upon receipt of the pulse signals, the control unit 4 detects a rotation speed of the electric motor 21, that is, an actual speed of the back door 102, based on the cycle of the pulse signals.

Further, the control unit 4 detects a rotation direction of the electric motor 21, that is, a moving direction of the back door 102, based on an appearance timing of the pulse signals input from the hall ICs 3B.

Further, the control unit 4 detects a position of the back door 102 by integrating the pulse signals starting from a time at which the back door 102 reaches a reference position (a closed position P1 or an opened position P2).

As illustrated in FIG. 2, the "closed position P1" is a position of the back door 102 that is completely closed. Meanwhile, the "opened position P2" is a position of the back door 102 that is completely opened.

A configuration of the rotation sensor 3 is not limited to that in the present embodiment, and may be, for example, a resolver or a rotary encoder. Alternatively, the rotation sensor 3 may be, for example, a proximity sensor, an overcurrent displacement sensor, a photoelectric sensor, or a laser sensor.

Figure 5:
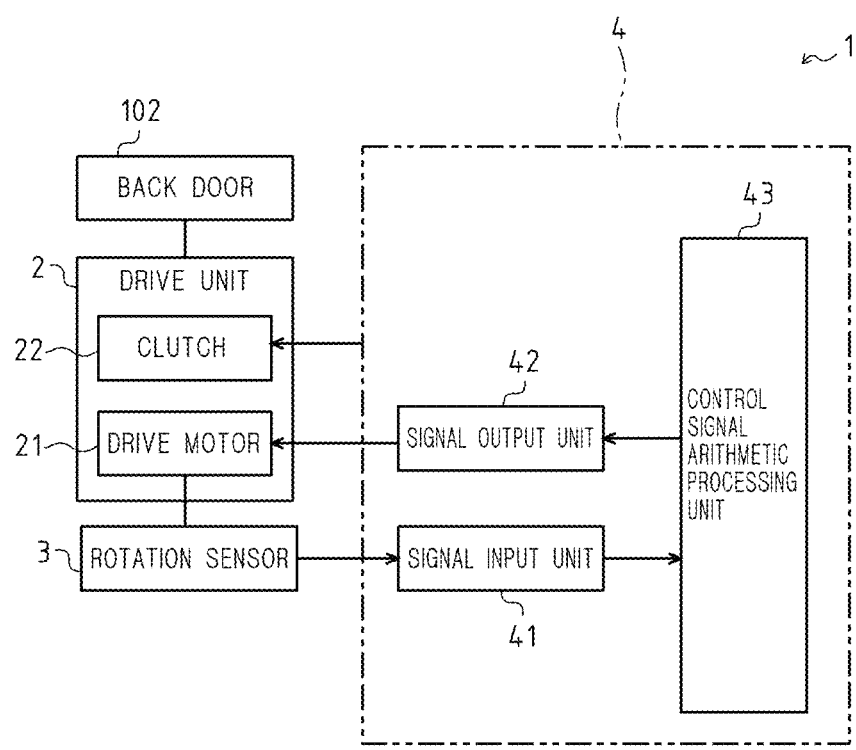
FIG. 5 illustrates a control system of the mobile body moving device according to the embodiment of the present invention.

The control unit 4 is a microcomputer, and includes a signal input unit 41 electrically connected to the rotation sensor 3, a signal output unit 42 electrically connected to the electric motor 21, and a control signal arithmetic processing unit 43 that is electrically connected to the signal input unit 41 and the signal output unit 42, executes arithmetic processing based on a signal input from the signal input unit 41, and then outputs a signal based on a result of the arithmetic processing to the signal output unit 42, as illustrated in FIG. 5.

The control signal arithmetic processing unit 43 stores therein in advance a program for executing PI (Proportional Integral) control, which is a kind of feedback control, and a digital map regarding the target speed of the back door 102.

The digital map is a "target movement speed rule" that prescribes the movement speed of the back door 102 according to the position of the moving back door 102, and the control signal arithmetic processing unit 43 is configured to execute the arithmetic processing based on the program and the digital map.

The signal output unit 42 includes a PWM circuit and a motor drive circuit which is a power semiconductor driven by the PWM circuit, and changes a duty ratio of the PWM circuit based on a signal input from the control signal arithmetic processing unit 43 to control the rotation speed of the electric motor 21.

The signal input unit 41 receives pulse signals output from the rotation sensor 3. Therefore, based on the received pulse signals, the signal input unit 41 outputs an actual speed signal and a position signal indicating an actual speed and a position of the back door 102, respectively to the control signal arithmetic processing unit 43.

Upon receipt of the actual speed signal and the position signal output from the signal input unit 41, the control signal arithmetic processing unit 43 computes, based on these signals, a control signal to be output to the electric motor 21 to bring the actual speed of the back door 102 to a target speed at the position.

Specifically, the control signal arithmetic processing unit 43 executes arithmetic processing based on the program and the digital map stored in advance therein and outputs, as a control signal, a signal obtained by adding or subtracting a correction amount obtained by multiplying a difference between the actual speed and the target speed of the back door 102 by a predetermined proportional term constant to or from a reference signal corresponding to the target speed of the back door 102.

Upon receipt of the control signal output from the control signal arithmetic processing unit 43, the signal output unit 42 changes the duty ratio of the PWM circuit based on the control signal to control the rotation speed of the electric motor 21.

[Speed Control Method of Mobile Body Moving Device 1]

Next, in the mobile body moving device 1 according to the present embodiment, a method for controlling a speed of the back door 102 during opening/closing operation of the back door 102 will be described with reference to FIGS. 2 and 6 to 9.

For example, in a case where operation for opening the back door 102 is performed in the mobile body moving device 1 to move the back door 102 from the closed position P1 to the opened position P2 as illustrated in FIG. 2, the movement speed of the back door 102 is controlled by the control unit 4 as follows.

Figure 6:
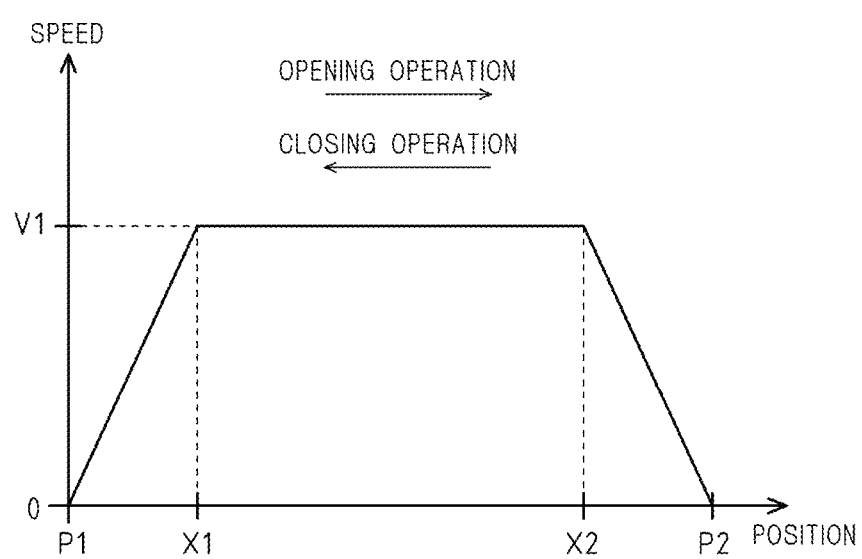
FIG. 6 is a graph showing a relationship between a position and a speed of the back door during opening and closing of the back door.

That is, the movement speed of the back door 102 is controlled by the control unit 4 to gradually rise at a constant acceleration until the back door 102 reaches a position X1 away by a predetermined distance from the closed position P1 toward the opened position P2 as illustrated in FIG. 6.

After the back door 102 reaches the position X1, the movement speed of the back door 102 is controlled to a predetermined speed V1 by the control unit 4 until the back door 102 reaches a position X2 away by a predetermined distance from the opened position P2 toward the closed position P1.

After the back door 102 reaches the position X2, the movement speed of the back door 102 is controlled by the control unit 4 to gradually decrease at a constant deceleration (negative acceleration) until the back door 102 reaches the opened position P2.

In a case where operation for closing the back door 102 is performed to move the back door 102 from the opened position P2 to the closed position P1, a method for controlling the movement speed of the back door 102 by the control unit 4 is substantially identical to that in the operation for opening the back door 102 except for a moving direction of the back door 102, and therefore description thereof is omitted.

As described above, the method for controlling the movement speed of the back door 102 by the control unit 4 is executed by feedback control using PI control.

Figure 7:
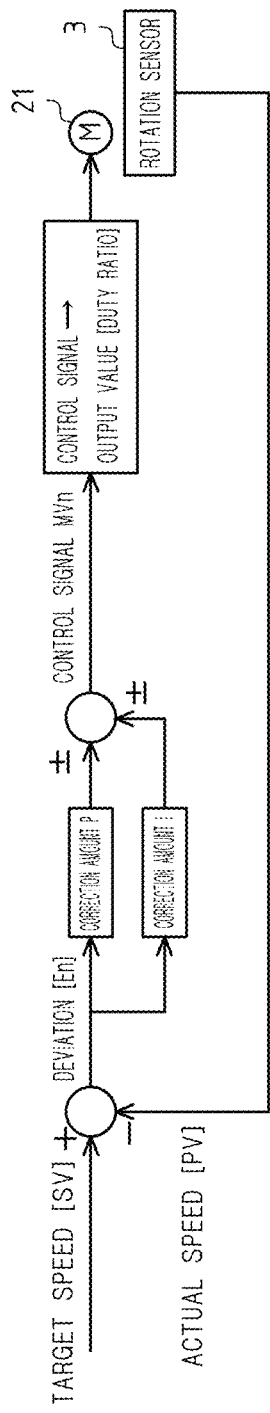
FIG. 7 is a block diagram illustrating a control system in a high-speed region in the mobile body moving device according to the embodiment of the present invention.

Specifically, as illustrated in FIGS. 5 and 7, the signal input unit 41 that has received the pulse signals from the rotation sensor 3 converts the pulse signals to calculate the actual speed (PV) and position of the back door 102 that is a mobile body as mobile body information.

Then, the signal input unit 41 outputs an actual speed signal and a position signal respectively indicating the actual speed (PV) and the position of the back door 102 to the control signal arithmetic processing unit 43.

Upon receipt of the actual speed signal and the position signal from the signal input unit 41, the control signal arithmetic processing unit 43 calculates a target speed (SV) corresponding to the input position signal based on the digital map (target movement speed rule) stored in advance therein and derives a deviation ($E_n$) between the target speed (SV) and an actual speed (PV) corresponding to the input actual speed signal.

Then, the control signal arithmetic processing unit 43 calculates a difference ($E_n - E_{n-1}$) from a deviation ($E_{n-1}$) derived one control cycle before, and multiplies the difference ($E_n - E_{n-1}$) by a proportional term constant Kp to derive a correction amount P proportional to the deviation.

Meanwhile, the control signal arithmetic processing unit 43 divides a control period ($T_S$) by an integration time ($T_I$), and multiplies the obtained value by the deviation ($E_n$) between the target speed (SV) and the actual speed (PV) to derive a correction amount I proportional to a time integral of the deviation.

Then, the control signal arithmetic processing unit 43 derives a control signal ($MV_N$) by adding the correction amount P and the correction amount I to a control signal one control cycle before (an operation amount to be output to the electric motor 21) ($MV_{N-1}$) and outputs the control signal ($MV_N$) to the signal output unit 42.

Then, upon receipt of the control signal ($MV_N$) from the control signal arithmetic processing unit 43, the signal output unit 42 outputs, as an output value, the changed duty ratio to the electric motor 21 based on the control signal ($MV_N$) to control the rotation speed of the electric motor 21.

This completes operation in one control period in the PI control by the control unit 4. Thereafter, the operation in one control cycle described above is repeatedly executed until the back door 102 reaches the opened position P2.

As described above, in the present embodiment, driving of the drive unit 2, that is, the rotational speed of the electric motor 21 is controlled by the control unit 4 based on the digital map (target movement speed rule) that prescribes the movement speed of the back door 102 according to the position of the back door 102.

Further, the movement speed of the back door 102 is controlled by the control unit 4 to an ideal speed closer to the digital map (target movement speed rule) by performing the above feedback control using the PI control.

As described above, the rotation sensor 3 provided in the drive unit 2 includes the multi-pole magnetizing magnet 3A fixed to the drive shaft 21a of the electric motor 21 and the two Hall ICs 3B•3B disposed in the vicinity of the rotation trajectory of the multi-pole magnetizing magnet 3A and is configured to detect the multi-pole magnetizing magnet 3A that reciprocatingly moves (rotary moves in the present embodiment) by the two Hall ICs 3B•3B at predetermined time intervals.

In other words, the rotation sensor (sensor) 3 includes the multi-pole magnetizing magnet (detected unit) 3A that reciprocatingly moves (rotary moves) in accordance with driving of the drive unit 2 (that is, rotation of the drive shaft 21a in the electric motor 21) and the Hall ICs (detection unit) 3B that detect the multi-pole magnetizing magnet 3A within a predetermined time, and the control unit 4 computes the speed of the back door (mobile body) 102 based on a time from detection of the multi-pole magnetizing magnet 3A by the Hall ICs 3B to next detection of the multi-pole magnetizing magnet 3A.

Accordingly, for example, in a case where the back door 102 reaches the vicinity of the opened position P2 during the opening operation and the rotation speed of the electric motor 21 is decelerated to an extremely low rotation speed, the multi-pole magnetizing magnet 3A detected at a certain timing by the Hall ICs 3B is not detected in time at a next timing, and it is erroneously determined that the electric motor 21 has stopped even though the electric motor 21 is being driven.

When such erroneous determination occurs, the control unit 4 changes the duty ratio and accelerates the rotation speed of the electric motor 21 more than necessary in order to bring the actual speed (PV) of the back door 102 closer to the target speed (SV) from the stopped state based on the erroneous determination, and when the Hall ICs 3B become able to detect the multi-pole magnetizing magnet 3A as a result of the acceleration, the control unit 4 changes the duty ratio to reduce the rotation speed of the electric motor 21 and decelerate the actual speed (PV) of the back door 102.

Then, when the actual speed (PV) of the back door 102 becomes low again, the rotation speed of the electric motor 21 is repeatedly accelerated and decelerated. As a result, a phenomenon called "shaking" occurs in a case where the back door 102 moves at a low speed in the vicinity of the opened position P2.

Figure 8:
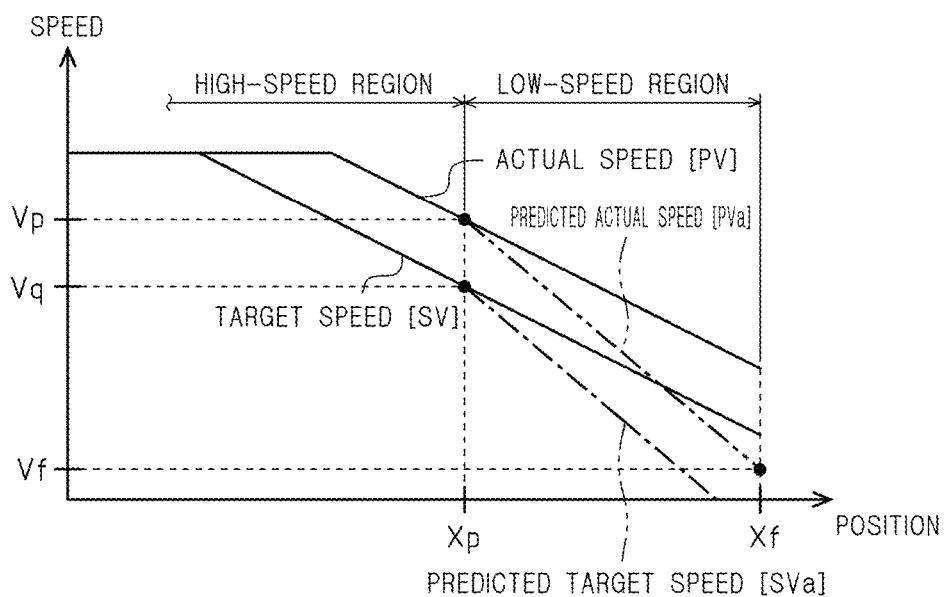
FIG. 8 is a graph showing a relationship between a position and a speed of the back door in a low-speed region during opening and closing of the back door.

In view of this, in the mobile body moving device 1 according to the present embodiment, a predetermined speed (hereinafter referred to as a "shaking speed Vp") is preset as a movement speed at which the back door 102 starts to "shaking", as illustrated in FIG. 8.

Then, in a "high-speed region" in which the back door 102 moves at a speed faster than the shaking speed Vp, driving of the drive unit (i.e., the rotation speed of the electric motor 21) is controlled by the control unit 4 so that the actual speed (PV) is adjusted to the target speed (SV) by comparing the actual speed (PV) of the back door 102 based on the mobile body information from the rotation sensor 3 and the target speed (SV) derived based on the digital map (target movement speed rule).

Specifically, for example, in a case where the operation for opening the back door 102 is performed, the rotation speed of the electric motor 21 is feedback-controlled by the control unit 4 so that the actual speed (PV) actually detected by the rotation sensor 3 is adjusted to the target speed (SV) as illustrated in FIG. 7 until reaching to a "low-speed region" in which the back door 102 moves at a speed less than or equal to the speed Vp in a deceleration region X2-P2.

Meanwhile, in the "low-speed region" where the back door 102 moves at a speed less than or equal to the shaking speed Vp, driving of the drive unit 2 (i.e., the rotation speed of the electric motor 21) is controlled by the control unit 4 by comparing a predicted actual speed (PVa) derived by a predetermined program as a low-speed movement speed rule and a predicted target speed (SVa) derived based on a changed target movement speed rule.

Specifically, in the low-speed region where the actual speed (PV) of the back door 102 is less than or equal to the shaking speed Vp, first, a digital map that is a linear function having a constant slope is derived as a "low-speed movement rule" by a predetermined arithmetic program, and then the digital map indicating the "target movement speed rule" is changed as a linear function having a slope equivalent to the "low-speed movement rule".

Figure 9:
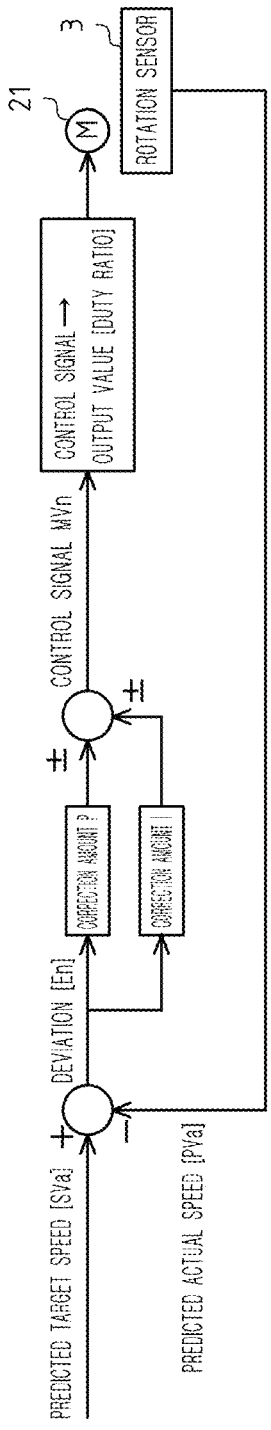
FIG. 9 is a block diagram illustrating a control system in the low-speed region in the mobile body moving device according to the embodiment of the present invention.

Then, the rotation speed of the electric motor 21 is feedback-controlled by the control unit 4 while comparing the predicted actual speed (PVa) derived based on the digital map indicating the "low-speed movement rule" and the predicted target speed (SVa) derived based on the digital map indicating the changed "target movement speed rule", as illustrated in FIG. 9.

"Controlling the rotation speed while comparing the predicted actual speed (PVa) and the predicted target speed (SVa)" in the low-speed region does not only mean controlling such that the predicted actual speed (PVa) is adjusted to the predicted target speed (SVa) while comparing the predicted actual speed (PVa) and the predicted target speed (SVa) with each other.

That is, the digital map (low-speed movement rule) for deriving the predicted actual speed (PVa) and the changed digital map (target movement speed rule) for deriving the predicted target speed (SVa) are parallel linear functions having the same slope as described above, and therefore, for example, control may be performed so that a difference between the predicted actual speed (PVa) and the predicted target speed (SVa) becomes always constant by comparing the predicted actual speed (PVa) and the predicted target speed (SVa).

The linear function configuring the digital map serving as the low-speed movement rule is derived as follows by a predetermined arithmetic program.

Specifically, as illustrated in FIG. 8, a speed Vf is defined in advance as an ideal actual speed of the back door 102 immediately before reaches a position Xf which is the opened position P2, and in a case where the movement speed of the back door 102 becomes the shaking speed Vp when the back door 102 reaches a position Xp, a slope $\alpha$ of the linear function indicating the low-speed movement rule is derived as a value ($\alpha=(Vf-Vp)/(Xf-Xp)$) obtained by dividing a difference (Vf–Vp) between the speed Vf and the shaking speed Vp by a difference (Xf–Xp) between the position Xf and the position Xp.

Further, based on the derived slope $\alpha$, an intercept $\beta 1$ of the linear function indicating the low-speed movement rule is derived as a difference ($\beta 1=Vf-\alpha \times Xf$) between the speed Vf and a value obtained by integrating the slope $\alpha$ and the position Xf.

In this way, the low-speed movement rule is derived as a linear function (predicted actual measurement (PVa)=$\alpha \times X+\beta 1$) where a variable X is the position of the backdoor 102.

Meanwhile, the linear function configuring the digital map serving as the changed target movement speed rule is derived as follows by a predetermined arithmetic program.

Specifically, in a case where the target speed (SV) of the back door 102 at the position Xp, which is derived based on the digital map (target movement speed rule before the change) stored in advance in the control signal arithmetic processing unit 43 (see FIG. 5), is a speed Vq (hereinafter referred to as a "predicted shaking speed Vq"), the slope $\alpha$ of the linear function indicating the changed target movement speed rule is the same slope $\alpha$ as the linear function indicating the low-speed movement rule described above, and an intercept $\beta 2$ of the linear function is derived as a difference ($\beta 2=Vq-\alpha \times Xp$) between the predicted shaking speed Vq and a value obtained by integrating the slope $\alpha$ and the position Xp.

In this way, the changed target movement speed rule is derived as a linear function (predicted target speed (SVa) =$\alpha \times X+\beta 2$) where the variable X is the position of the back door 102.

As described above, in the present embodiment, when the actual speed (PV) of the back door 102 becomes less than or equal to the shaking speed Vp, a low-speed movement speed rule that is a digital map configured with a linear function is derived by a predetermined program, and the target movement speed rule is changed based on the low-speed movement speed rule. However, this is not limited thereto.

For example, a digital map indicating the newly derived low-speed movement speed rule and a digital map indicating the changed target movement speed rule may be stored in advance in the control signal arithmetic processing unit 43, and when the actual speed (PV) of the back door 102 becomes less than or equal to the shaking speed Vp, feedback control may be performed by the control unit 4 by immediately calling up the stored low-speed movement speed rule and changed target movement speed rule without deriving these rules by a predetermined program.

Further, in the present embodiment, when the actual speed (PV) of the back door 102 becomes less than or equal to the shaking speed Vp, the target movement speed rule is changed based on the low-speed movement speed rule. However, this is not limited thereto.

For example, in a case where the decelerated actual speed (PV) of the back door 102 is already sufficiently close to the target speed (SV) in the high-speed region, a linear function configuring a digital map indicating a target movement speed rule changed based on the low-speed movement speed rule is a linear function substantially equivalent to a linear function configuring the digital map indicating the target movement speed rule before the change.

In such a case, the target movement speed rule before the change may be continuously used without changing the target movement speed rule based on the low-speed movement speed rule.

In the present embodiment, a timing at which a low-speed movement speed rule is derived by a predetermined program and the target movement speed rule is changed based on the low-speed movement speed rule is a timing at which the movement speed of the back door 102 becomes less than or equal to the shaking speed Vp. However, this is not limited thereto.

For example, a low-speed movement speed rule may be derived by a predetermined program and the target movement speed rule may be changed based on the low-speed movement speed rule immediately before the movement speed of the back door 102 becomes less than or equal to the shaking speed Vp, that is, immediately before the rotation speed of the electric motor 21 is controlled by the control unit 4 while comparing the predicted actual speed (PVa) and the predicted target speed (SVa). The control unit 4 can control the drive unit 2 so that the back door 102 moves at the same deceleration rate as the predicted target speed (SVa) based on the predicted target speed (SVa) in the low-speed region by using the low-speed movement speed rule.

In the present embodiment, whether the movement speed of the back door 102 is faster than the shaking speed Vp or is less than or equal to the shaking speed Vp is determined based on the actual speed (PV) detected by the rotation sensor 3. However, this is not limited thereto.

For example, a voltage applied to the electric motor 21 or torque output by the electric motor 21 when the movement speed of the back door 102 becomes the shaking speed Vp may be grasped in advance, and whether the movement speed of the back door 102 is faster than the shaking speed Vp or is less than or equal to the shaking speed Vp may be determined based on the voltage or torque.

Alternatively, it may be determined that the "low-speed region" has been reached after the movement speed becomes less than or equal to the target speed Vq on the digital map or reaches the position Xp where deceleration is scheduled in advance, but a condition "actual speed>target speed" is also preferably used as a determination condition.

[Effects of the Present Embodiment]

As described above, the mobile body moving device 1 according to the present embodiment includes the back door (mobile body) 102, the drive unit 2 that moves the back door 102 to open and close, the rotation sensor (sensor) 3 that detects the movement of the back door 102, and the control unit 4 that controls driving of the drive unit 2 (i.e., the rotation speed of the electric motor 21) based on the target speed (target movement speed rule) SV that prescribes the movement speed of the back door 102 according to the position of the back door 102.

In the high-speed region in which the back door 102 moves at a speed faster than the shaking speed (predetermined speed) Vp, the control unit 4 is configured to perform feedback control of driving of the drive unit 2, that is, the rotation speed of the electric motor 21 so that the actual speed (PV) based on the mobile body information from the rotation sensor 3 is adjusted to the target speed (SV) by comparing the actual speed (mobile body actual speed) (PV) and the target movement speed rule (more specifically, the target speed (SV) derived based on the target movement speed rule).

Further, in the low-speed region in which the back door 102 moves at a speed less than or equal to the shaking speed Vp, the control unit 4 is configured to drive the electric motor 21 of the drive unit 2 by comparing a predetermined low-speed movement speed rule (more specifically, the predicted actual speed (PVa) derived based on the low-speed movement speed rule) and the target movement speed rule (for example, the predicted target speed (SVa) derived based on the changed target movement speed rule in the present embodiment).

As described above, in the mobile body moving device 1 according to the present embodiment, in the low-speed region where "shaking" of the back door 102, which is an example of the mobile body, occurs, driving of the drive unit 2 (that is, the rotation speed of the electric motor 21) is controlled by comparing the predicted actual speed (PVa) derived based on the low-speed movement speed rule instead of the actual speed (PV) based on the mobile body information from the rotation sensor 3 with the predicted target speed (SVa) derived based on the changed target movement speed rule.

This can suppress occurrence of "shaking" of the back door 102 without erroneously determining that the electric motor 21 that is actually being driven has stopped in a case where the rotation speed of the electric motor 21 is reduced to an extremely low rotation speed due to the configuration in which the rotation sensor 3 detects the multi-pole magnetizing magnet 3A at predetermined time intervals by the two Hall ICs 3B·3B.

REFERENCE SIGNS LIST

1 mobile body moving device
2 drive unit
21 electric motor
21*a* drive shaft
22 drum
3 rotation sensor (sensor)
3A multi-pole magnetizing magnet
3B Hall IC
4 control unit
41 signal input unit
42 signal output unit
43 control signal arithmetic processing unit
100 vehicle
101 vehicle body
102 back door
P1 closed position
P2 opened position
SV target speed
SVa predicted target speed
PV actual speed
PVa predicted actual speed
Vp shaking speed
Vq predicted shaking speed

The invention claimed is:

1. A device comprising:
a mobile body that is moved to open and close an opening;
a drive unit that moves the mobile body in first and second directions to open and close the opening, respectively;
a sensor that detects the movement of the mobile body; and
a control unit that controls driving of the drive unit based on a target movement speed rule that prescribes a movement speed of the mobile body according to a position of the mobile body,
wherein
in a high-speed region where the mobile body moves at a speed faster than a predetermined speed, the control unit compares an actual speed of the mobile body detected by the sensor and the movement speed of the mobile body calculated by the target movement speed rule and controls the drive unit to adjust the actual speed of the mobile body to the movement speed of the mobile body calculated by the target movement speed rule,
in a low-speed region where the mobile body moves at a speed less than or equal to the predetermined speed, the control unit compares a predicted actual speed of the mobile body calculated by a predetermined low-speed movement speed rule and a predicted target speed of the mobile body calculated by the target movement speed rule and controls the drive unit to maintain a constant difference between the predicted actual speed of the mobile body and the predicted target speed of the mobile body, and
the predicted actual speed of the mobile body calculated by the predetermined low-speed movement speed rule is calculated by a predetermined program.

* * * * *